(12) United States Patent
Munson et al.

(10) Patent No.: US 12,448,931 B2
(45) Date of Patent: Oct. 21, 2025

(54) TORQUE COMPENSATION FOR AIR/FUEL SWITCHING

(71) Applicant: TOYOTA MOTOR ENGINEERING & MANUFACTURING NORTH AMERICA, INC., Plano, TX (US)

(72) Inventors: Garrett Parker Munson, Milford, MI (US); Adam C. McJunkin, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 235 days.

(21) Appl. No.: 18/171,417

(22) Filed: Feb. 20, 2023

(65) Prior Publication Data

US 2024/0280063 A1   Aug. 22, 2024

(51) Int. Cl.
  *F02D 41/08*   (2006.01)
  *F02D 41/02*   (2006.01)
  *F02D 41/14*   (2006.01)

(52) U.S. Cl.
  CPC ..... F02D 41/1454 (2013.01); F02D 41/0235 (2013.01); F02D 41/08 (2013.01); F02D 41/1439 (2013.01); *F02D 2200/04* (2013.01); *F02D 2200/1002* (2013.01); *F02D 2200/501* (2013.01)

(58) Field of Classification Search
  CPC ... F02D 41/0235; F02D 41/08; F02D 41/1454
  USPC ...... 123/339.11, 339.12, 344, 443, 680, 681, 123/703, 704; 701/103, 109, 110
  See application file for complete search history.

(56) References Cited

U.S. PATENT DOCUMENTS

| | | | | |
|---|---|---|---|---|
| 4,501,240 A | * | 2/1985 | Aono | F02D 31/001 123/352 |
| 4,599,981 A | * | 7/1986 | Miyano | F02D 41/2454 123/399 |
| 4,612,889 A | * | 9/1986 | Sugiura | F02D 41/1486 123/678 |
| 6,152,105 A | * | 11/2000 | Nishimura | F02P 5/1508 123/436 |
| 6,910,460 B2 | * | 6/2005 | Asano | F02D 35/0061 123/527 |
| 9,453,782 B2 | | 9/2016 | Qiao et al. | |
| 10,094,307 B2 | | 10/2018 | Yoshizaki et al. | |

(Continued)

FOREIGN PATENT DOCUMENTS

| JP | 2014/234776 A | 12/2014 |
|---|---|---|
| JP | 6217739 B2 | 10/2017 |

(Continued)

*Primary Examiner* — Erick R Solis
(74) *Attorney, Agent, or Firm* — HAYNES AND BOONE, LLP

(57) ABSTRACT

A vehicle includes one or more processors configured to select an air/fuel ratio for the engine that is different from the stoichiometric air/fuel ratio. The one or more processors are further configured to select a torque request for the engine, determine a load request for the engine based on at least the torque request and the selected air/fuel ratio, and determine an output to a throttle actuator based on the load request for the engine.

18 Claims, 9 Drawing Sheets

(56) References Cited

U.S. PATENT DOCUMENTS

2004/0144360 A1\* 7/2004 Surnilla ............... F01N 13/009
  123/339.11
2016/0265465 A1\* 9/2016 Yamaguchi ......... F02D 41/1495

FOREIGN PATENT DOCUMENTS

JP          6287939 B2   3/2018
JP          6308150 B2   4/2018

\* cited by examiner

TORQUE COMPENSATION FOR AIR/FUEL SWITCHING

TECHNICAL FIELD

The subject matter described herein relates to devices and methods for updating variables affecting the torque output of an engine based on switching of air-fuel ratios. This technology has particular but not exclusive utility for cars and trucks.

BACKGROUND

Pollution mitigation is an important feature of modern vehicles. For example, the exhaust system of a vehicle may include a catalytic converter, which includes one or more catalysts capable of absorbing or adsorbing gases such as oxygen, carbon monoxide, nitrogen oxides, and un-combusted or partially combusted hydrocarbons from the engine exhaust. When absorbed in the catalysts or adsorbed onto the surface of the catalysts, the oxygen, carbon monoxide, nitrogen oxides, and hydrocarbons can react, thus reducing the hydrocarbons into less harmful emissions such as carbon dioxide or water vapor.

In order to maximize useful reactions within the catalytic converter and thus minimize harmful emissions, it may be desirable to keep the ratio between oxygen and hydrocarbons within a catalyst at a stoichiometric level (i.e., matching the levels such that every hydrocarbon molecule has oxygen with which to react). Thus, it may be desirable for the engine to combust a fuel-rich air/fuel (A/F) mixture at certain times and a fuel-lean mixture at other times. An air/fuel sensor downstream of the catalytic converter can be used to detect whether unreacted hydrocarbons are being removed at a desired level. When this sensor is used as part of a closed-loop control system, an air/fuel controller within the engine may switch the engine's combustion mixture between rich and lean in order to optimize catalytic converter functioning and thus produce emissions at approximately the stoichiometric ideal. When the engine is at idle, for example, such switching back and forth between a rich mixture and a lean mixture may occur approximately every 15 seconds.

When the A/F ratio is changed, fluctuations in engine speed result. For example, when the A/F ratio is rich, there is an increase in torque that results in a "flare" of engine power output. Similarly, when the A/F ratio is lean, there is a decrease in torque that causes a "dip" in power output. When the engine is running at speed, such changes in power output may be small relative to the total output of the engine. However, when the engine is at idle (e.g., when there is zero deflection of the vehicle's accelerator pedal), the changes in torque or power output due to A/F switching can result in engine speed changes while stationary that can be noticed by vehicle occupants. These changes in engine speed can also have adverse effects on low-speed driveability in a way that is noticeable to consumers.

The information included in this Background section of the specification, including any references cited herein and any description or discussion thereof, is included for technical reference purposes only and is not to be regarded as limiting.

SUMMARY

Disclosed is an A/F switching torque compensation system that provides real-time or near-real-time changes in requested engine load based on air-fuel ratio (A/F) switching. Devices, methods, and systems are disclosed herein for such torque compensation. For example, this A/F switching torque compensation system detects a requested change in the air-fuel ratio and compensates by adjusting the engine load request (e.g., changing the throttle angle, etc.), in real time, rather than reactively after a change in torque is detected. Thus, instead of flaring or dipping for multiple seconds, the engine load rapidly (e.g., within a fraction of a second) changes to match the new A/F.

The A/F switching torque compensation system disclosed herein has particular, but not exclusive, utility for cars and trucks. A system of one or more computers can be configured to perform particular operations or actions of the A/F switching torque compensation system by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle equipped with one or more processors disposed within the vehicle and configured to: select an air/fuel ratio for an engine of the vehicle, where the selected air/fuel ratio is different from a stoichiometric air/fuel ratio; select a torque request for the engine; determine a load request for the engine based on at least the torque request and the selected air/fuel ratio; and determine a first output to a throttle actuator based on the load request for the engine. Other embodiments of this aspect include corresponding computer systems, apparatus, and computer programs recorded on one or more computer storage devices, each configured to perform the actions of the methods.

Implementations may include one or more of the following features. In some embodiments, the one or more processors are further configured to determine a second output to a spark actuator based on the load request for the engine. In some embodiments, the one or more processors are further configured to determine a third output to a variable valve timing (VVT) actuator based on the load request for the engine. In some embodiments, selecting the air/fuel ratio is based at least in part on a sensor reading from an air/fuel sensor located downstream of a catalytic converter in an exhaust system of the vehicle. In some embodiments, the air/fuel ratio is selected to improve performance of the catalytic converter by affecting a ratio of oxygen and hydrocarbons stored within a catalyst of the catalytic converter. In some embodiments, affecting the ratio of oxygen and hydrocarbons stored within the catalyst includes driving the ratio closer to a stoichiometric ratio. In some embodiments, the engine is at idle. In some embodiments, the one or more processors are configured to, if blocking criteria are not met, determine the load request for the engine based on at least the torque request and a stoichiometric air/fuel ratio. In some embodiments, the blocking criteria include whether a speed of the vehicle is below a threshold value. In some embodiments, the blocking criteria include whether the selected air/fuel ratio is different from a previously selected air/fuel ratio. In some embodiments, the one or more processors are further configured to: if the selected air/fuel ratio exceeds a threshold maximum, determine the load request for the engine based on at least the torque request and the threshold maximum; and if the selected air/fuel ratio is less than a threshold minimum, determine the load request for the engine based on at least the torque request and the threshold minimum. In some embodiments, determining the load request for the engine based on at least the torque request and the selected air/fuel ratio prevents a dip or surge in engine speed when the selected air/fuel ratio is different from a previously selected air/fuel ratio. Implementations of the described techniques may include hardware, a method or process, or computer software on a computer-accessible medium.

One general aspect includes a method. The method includes, with one or more processors disposed within a vehicle: selecting an air/fuel ratio for an engine of the vehicle, where the selected air/fuel ratio is different from a stoichiometric air/fuel ratio; selecting a torque request for the engine; determining a load request for the engine based on at least the torque request and the selected air/fuel ratio; and determining, based on the load request for the engine, at least one of a first output to a throttle actuator, a second output to a spark actuator, or a third output to a variable valve timing (VVT) actuator. Other embodiments of this aspect include corresponding computer systems, apparatus, and computer programs recorded on one or more computer storage devices, each configured to perform the actions of the methods.

Implementations may include one or more of the following features. In some embodiments, selecting the air/fuel ratio is based at least in part on a sensor reading from an air/fuel sensor located downstream of a catalytic converter in an exhaust system of the vehicle, where the air/fuel ratio is selected to improve performance of the catalytic converter by affecting a ratio of oxygen and hydrocarbons stored within a catalyst of the catalytic converter by driving the ratio closer to a stoichiometric ratio. In some embodiments, the method may include: if blocking criteria are not met, determining the load request for the engine based on at least the torque request and a stoichiometric air/fuel ratio. In some embodiments, the blocking criteria include whether a speed of vehicle is below a threshold value. In some embodiments, the blocking criteria include whether the selected air/fuel ratio is different from a previously selected air/fuel ratio. In some embodiments, the one or more processors are further configured to: if the selected air/fuel ratio exceeds a threshold maximum, determine the load request for the engine based on at least the torque request and the threshold maximum; and if the selected air/fuel ratio is less than a threshold minimum, determine the load request for the engine based on at least the torque request and the threshold minimum. Implementations of the described techniques may include hardware, a method or process, or computer software on a computer-accessible medium.

One general aspect includes a system that includes a vehicle. The system also includes one or more processors disposed within the vehicle and configured to, if an engine of the vehicle is at idle: select an air/fuel ratio for the engine of based at least in part on a sensor reading from an air/fuel sensor located downstream of a catalytic converter in an exhaust system of the vehicle, where the selected air/fuel ratio is different from a stoichiometric air/fuel ratio; select a torque request for the engine; if the selected air/fuel ratio exceeds a threshold maximum, determine a load request for the engine based on at least the torque request and the threshold maximum; if the selected air/fuel ratio is less than a threshold minimum, determine the load request for the engine based on at least the torque request and the threshold minimum. if the selected air/fuel ratio is between the threshold minimum and the threshold maximum, determine the load request for the engine based on at least the torque request and the selected air/fuel ratio; and determine, based on the load request for the engine, at least one of a first output to a throttle actuator, a second output to a spark actuator, or a third output to a variable valve timing (VVT) actuator. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the driving profile adaptation system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
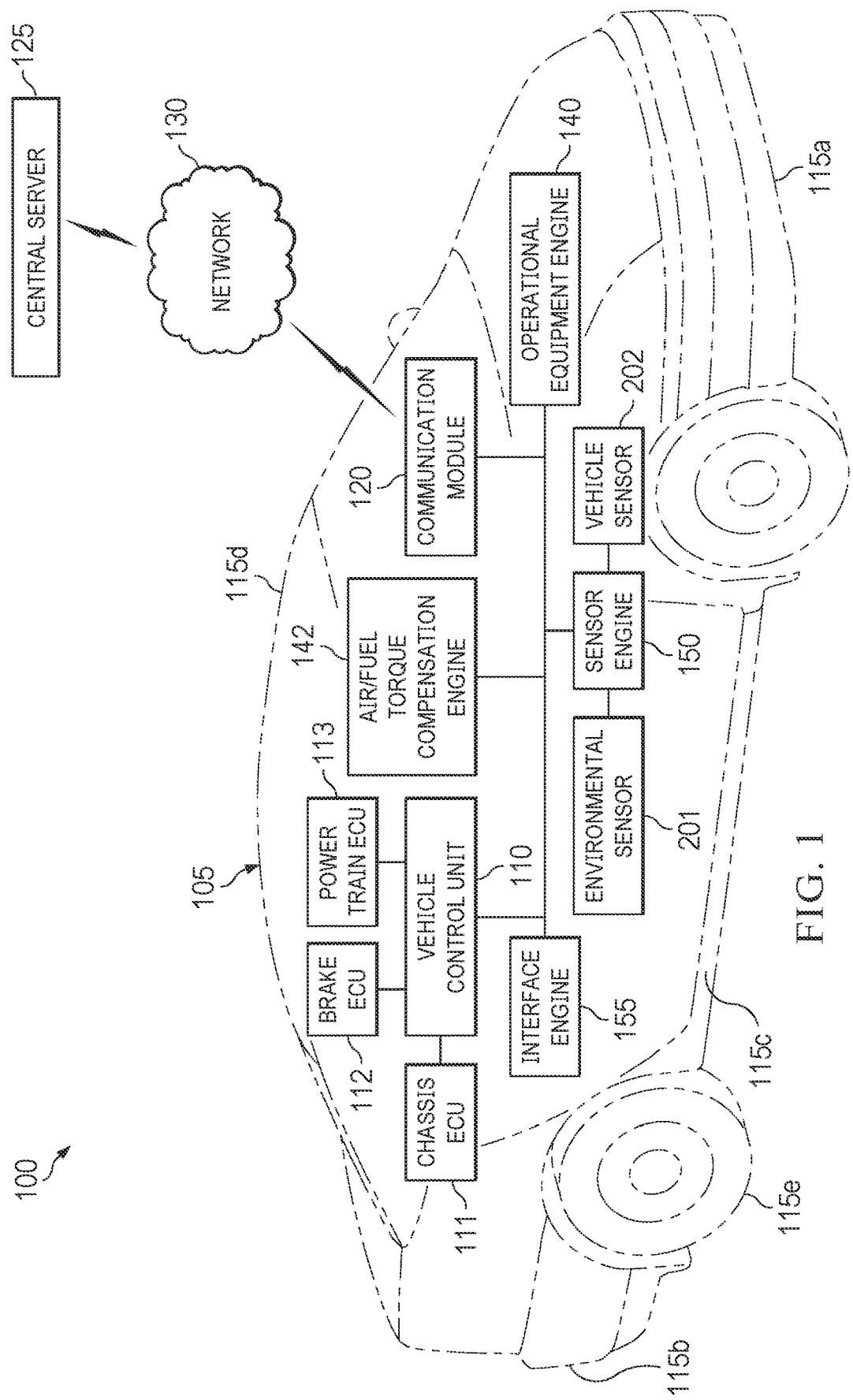
FIG. 1 is an illustration, in a block diagram form, of a A/F switching torque compensation system, in accordance with at least one embodiment of the present disclosure.

Engine torque output may be governed by a torque scheduler, which takes in data from various sensors (e.g., a pedal deflection sensor, spark sensor, etc.) and outputs an engine load request to various actuator controllers (e.g., a throttle controller, spark controller, variable valve timing (VVT) controller, boost controller or waste gate controller, etc.). Within the torque scheduler, an idle speed controller or other closed-loop control system may be configured to detect changes in torque and respond by changing the engine load request. However, when changes in torque are caused by air-fuel ratio (A/F) switching, the compensating response of the torque controller may lag significantly behind the A/F switching event, such that engine speed does not return to its pre-switching level for several seconds. This is largely due to the torque controller being a reactive controller that must be tunes for maximum stability. This slow response may be noticed by the consumer as a variability in engine sound, vehicle speed, hill holding ability, etc. Such "reactive" systems thus have consumer-noticeable drawbacks. A need exists for improved engine control systems that address the foregoing and other concerns.

Disclosed herein are devices, methods, and systems for torque compensation for air/fuel switching. This A/F switching torque compensation system detects a requested change in the air-fuel ratio (e.g., to control for stoichiometric emissions), and compensates by proactively adjusting the engine load request (e.g., opening the throttle to allow more air and fuel to be injected into the cylinders, closing the throttle to allow less air and fuel to be injected into the cylinders, etc.), in real time at the time of switching, rather than reactively after a change in torque is detected. Thus, instead of a flare or dip in engine speed that lasts for multiple seconds, the engine exhibits a step-function change in requested engine load that is quickly matched (e.g., within a fraction of a second) by a comparable change in actual engine load.

The present disclosure aids substantially in the control of the engine, especially at low speeds or when stopped, by adjusting the engine load request in real time based on emissions-related changes in the requested A/F ratio. Implemented on one or more processors within the vehicle, the A/F switching torque compensation system disclosed herein provides practical, real-time or near-real-time compensation for flares and dips in engine speed resulting from A/F switching. This improved torque scheduling transforms an engine that exhibits periodic speed dips and flares into one that is responsive to real-time or near-real-time changes in A/F, without the normally routine need for the vehicle to detect the dips and flares themselves and provide correction after the fact. This unconventional approach improves the functioning of the vehicle, by enabling more accurate real-time control over engine load requests issued to actuator controllers such as throttle and spark controllers.

The A/F switching torque compensation system may be considered a controller, and may be implemented as a combination of hardware and/or software modules, and operated by a control process executing on a processor circuit that accepts inputs from sensors and from other controllers within the vehicle, and that issues outputs to actuator controllers that control the engine load. In that regard, the control process performs certain specific operations in response to different inputs made at different time. Certain structures, functions, and operations of the processor circuit, sensors, and input systems are recited herein to enable novel features or aspects of the present disclosure with particularity.

These descriptions are provided for exemplary purposes only, and should not be considered to limit the scope of the A/F switching torque compensation system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is an illustration, in a block diagram form, of an A/F switching torque compensation system in accordance with at least one embodiment of the present disclosure. In an example, an A/F switching torque compensation system is referred to by the reference numeral 100 and includes a vehicle 105, such as an automobile, and a vehicle control unit (VCU) 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the A/F switching torque compensation system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously referred to as an engine ECU, power plant ECU, motor ECU, or transmission ECU) that controls elements of the motor and drivetrain. The system also includes one or more environmental sensors 201, one or more vehicle sensors 202, and an air/fuel (A/F) torque compensation engine 142, the operation of which will be described below.

It is understood that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
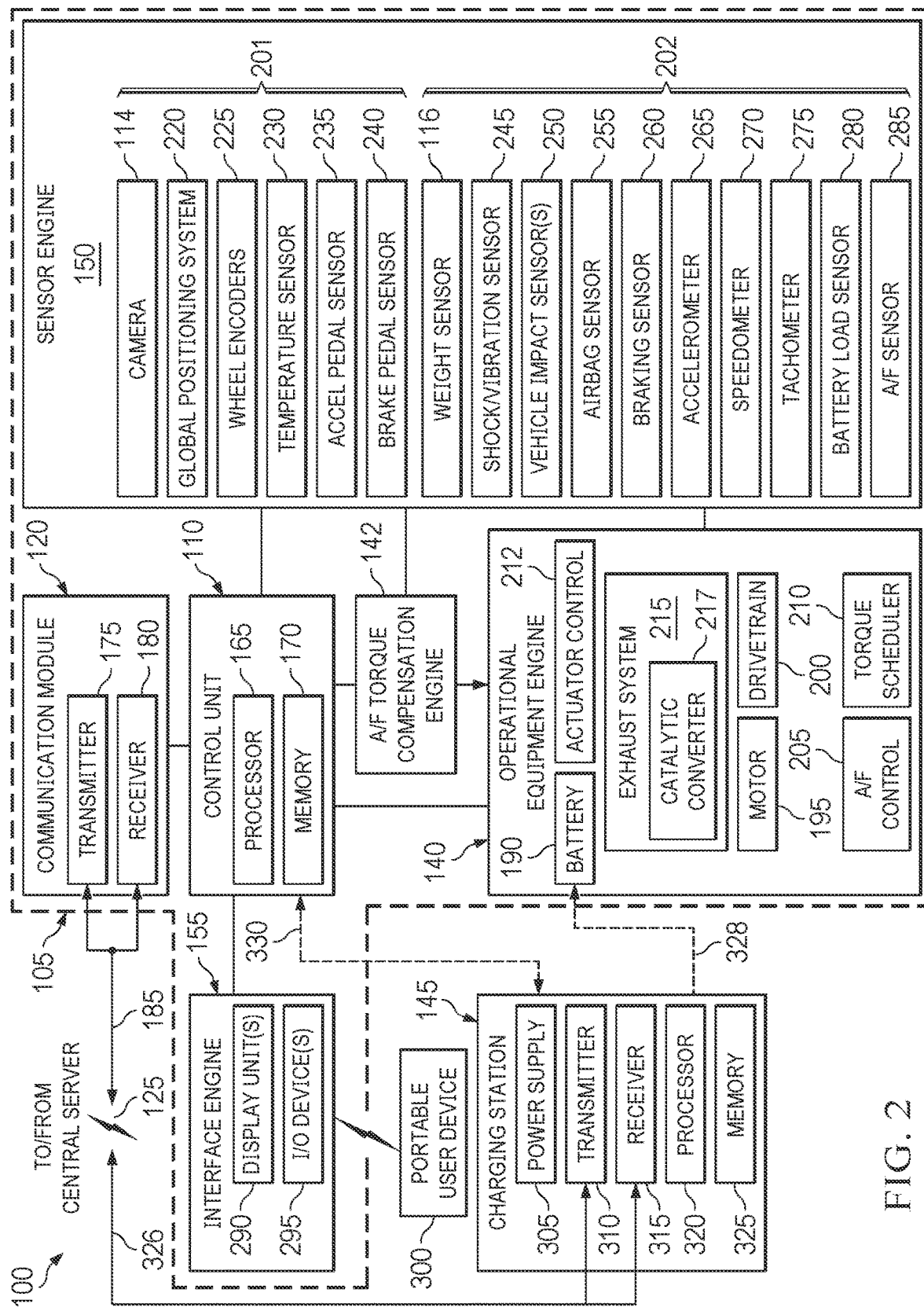
FIG. 2 is an illustration, in a block-diagram form, of at least a portion of the A/F switching torque compensation system of FIG. 1, in accordance with at least one embodiment of the present disclosure.

FIG. 2 is an illustration, in a block-diagram form, of at least a portion of the A/F switching torque compensation system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, and a drivetrain or transmission 200. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof.

In some embodiments, the motor 195 is an internal combustion motor and the battery 190 operates a starter. In such examples, the vehicle 105 may include an exhaust system 215 that includes a catalytic converter 217, and the operational equipment engine 140 may include an A/F controller 205 that responds to an A/F sensor 285 located downstream of the catalytic converter 217 (e.g., between the catalytic converter and the tailpipe). The A/F controller may for example alter the A/F ratio of the engine in order to drive the ratio of oxygen vs. hydrocarbons at the catalyst toward a stoichiometric ratio. The operational equipment engine 140 may also include actuator controllers 212 that control the throttle, spark, variable valve timing (VVT) and other functions related to engine output, as well as a torque scheduler 210, that receives inputs from sensors (e.g., the acceleration pedal sensor 235, brake pedal sensor 240, speedometer 270, tachometer 275, etc.) and from other controllers (e.g., the A/F controller 205) and generates outputs to the actuator controllers 212. Depending on the implementation, any or all of the A/F controller 205, the actuator controllers 212, the torque scheduler 210, or the A/F torque compensation engine may be aspects of the power train ECU 113, VCU 110, or other controller or processor within the vehicle.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.), wheel encoders 225, accelerator pedal deflection sensors 235, brake pedal deflection sensors 240, a shock/vibration sensor 245, a vehicle impact sensor 250, an airbag sensor 255, a braking sensor 260, an accelerometer or acceleration sensor 265, a speedometer 270, a tachometer 275, a battery load sensor 280, an air/fuel (A/F) sensor 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin, engine, engine compartment, exhaust pipe, or otherwise. Sub-components of the sensor engine 150 may be deployed at any operational area where information on the driving of the vehicle 105 may occur. Readings from the sensor engine 150 are fed back to the vehicle control unit 110, brake ECU 112, power train ECU or hybrid ECU 113, and/or A/F torque compensation engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system (e.g., a portion of the drivetrain 200) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or A/F torque compensation engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated. In other examples, the portable device is, or can serve as, an electronic key fob.

Also visible is a vehicle charging or refueling station 145, which supplies fuel or energy 328 to the operational equipment engine 140, and may include such components as a power supply 305, transmitter 310, receiver 315, processor 320, and memory 325.

The A/F switching torque compensation system 100 also includes an A/F torque compensation engine 142, the operation of which will be described below. In some embodiments, the A/F torque compensation engine 142 comprises a standalone housing with its own processor and memory. In other embodiments, the A/F torque compensation engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
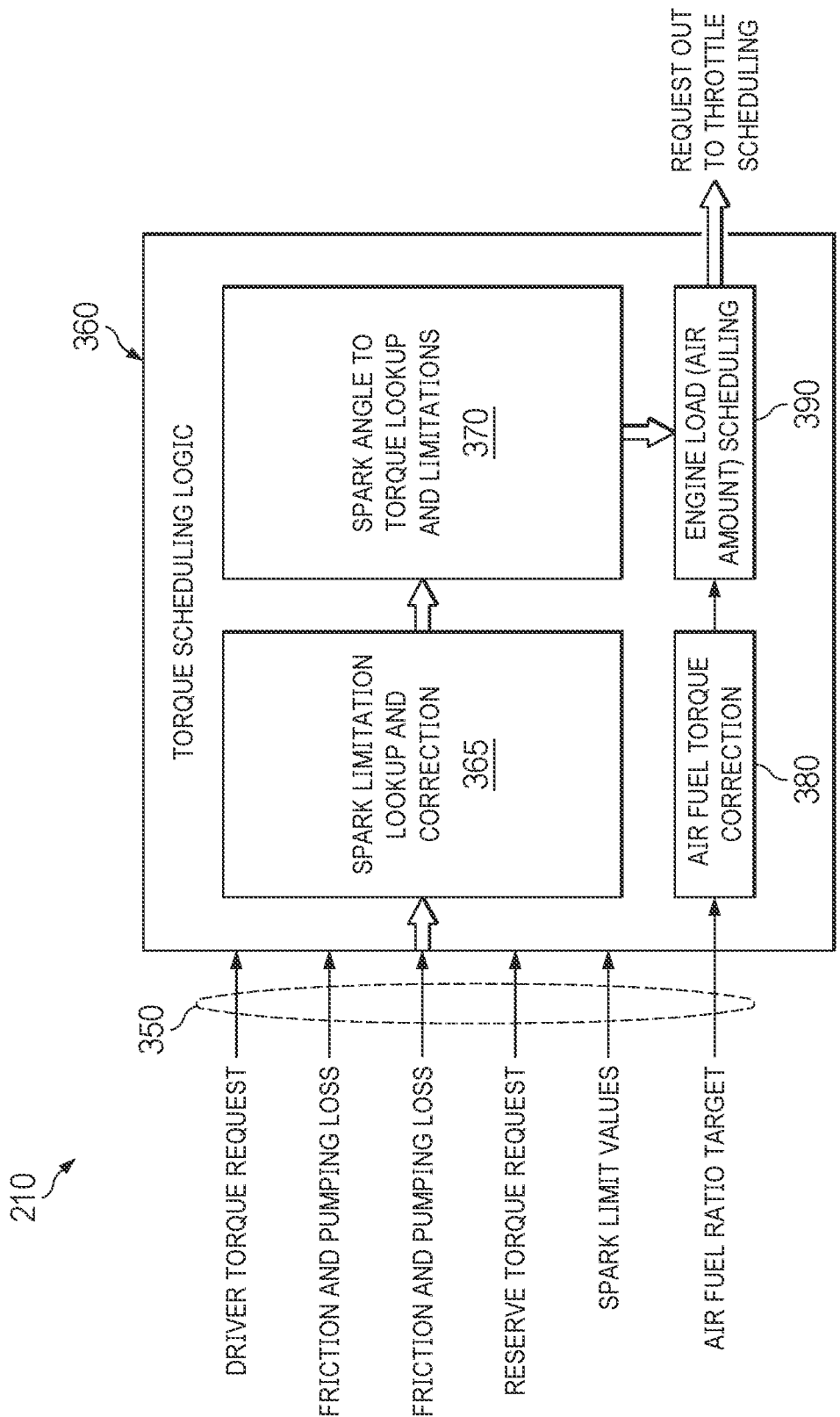
FIG. 3 is an illustration, in block diagram form, of an exemplary simplified torque scheduler, in accordance with at least one embodiment of the present disclosure.

FIG. 3 is an illustration, in block diagram form, of an exemplary simplified torque scheduler 210, in accordance with at least one embodiment of the present disclosure. In its most basic form, the torque scheduler 210 would simply translate a torque request into an engine load request, according to a linear function, e.g.: (load request)=k*(torque request), where k is a constant based on engine characteristics and/or vehicle characteristics. However, this calculation or lookup may be modified, based at least in part on sensor data obtained from the sensor engine 150, as well as the current maximum spark efficiency, engine operating conditions, environmental conditions, as well as the stoichiometric A/F target. In an example, the stoichiometric A/F target 380 is a dimensionless mass ratio of air to fuel equal to 14.6 or 14.7, which may facilitate near-stoichiometric (e.g., maximally efficient) reactions within the catalytic converter. However, other values or ratios, including volume and molar ratios, may be used instead or in addition, depending on the implementation. Thus, in practice the relationship between the torque request and load request is more complex than a simple linear relationship, as will be appreciated by a person of ordinary skill in the art.

A complete description of torque scheduling calculations is beyond the scope of the present disclosure. However, in the example shown in FIG. 3, the torque scheduler 210 includes input variables 350 and logic 360. The logic 360 includes a spark limitation lookup and correction 365, a spark efficiency calculation 370, and an A/F correction calculation 380 that yields an A/F engine load request correction 390, which can be (or can be translated into) a request to a throttle controller.

Figure 4:
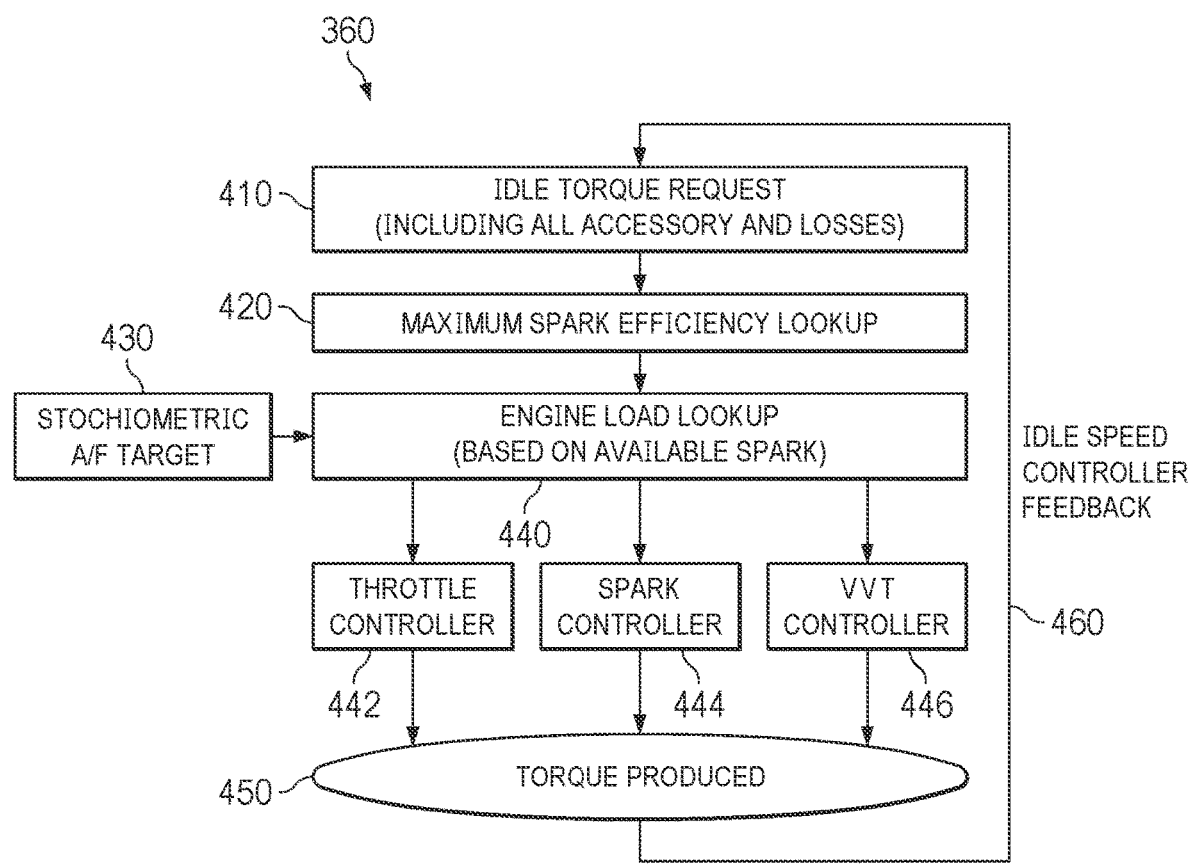
FIG. 4 is a simplified illustration of at least a portion of exemplary logic of a torque scheduler of the A/F switching torque compensation system, in accordance with at least one embodiment of the present disclosure.

FIG. 4 is a simplified illustration of at least a portion of exemplary logic 360 of a torque scheduler 210 of the A/F switching torque compensation system 100, in accordance with at least one embodiment of the present disclosure. The exemplary logic 360 is shown in a hybrid flow diagram/block diagram form.

The logic 360 receives a torque request 410. Typically, the logic 360 will operate during engine idle conditions (e.g., zero deflection of the accelerator pedal), such that the torque request 410 is an idle torque request. The torque request 410 will typically include sufficient torque to overcome friction losses, inertial losses, and accessory loads (e.g., the alternator, pumps, etc.) while maintaining the vehicle at the desired speed (which, even at idle, may be zero or nonzero depending on the implementation, as well as factors such as road grade, brake pedal deflection, etc.).

Based on the torque request, the logic 360 performs a lookup or calculation of the maximum spark efficiency 420. The maximum spark efficiency 420 is calculated as a fraction or percentage of the mean best torque spark efficiency (e.g., 100%), based on spark retardation and other factors. For example, if the idle requested torque is less than 100%, or the spark is retarded to protect against engine knock, or the spark is a pre-ignition spark at higher engine speeds, the spark efficiency may be reduced. Thus, the maximum spark efficiency is an estimate of the efficiency of the spark the engine will actually produce on this calculation cycle (e.g., the current 10 Hz cycle).

Next, the logic 360 performs a lookup or calculation of the desired engine load, also known as the engine load request 440, as shown above in FIG. 3. Inputs to this calculation include the current maximum spark efficiency 420, as well as the stoichiometric A/F target 430 (e.g., a dimensionless mass ratio of 14.6).

The engine load request 440 is then sent to actuator controllers (e.g., actuator controllers 212 of FIG. 2), possibly including but not limited to a throttle controller 442, spark controller 444, variable valve timing (VVT) controller 446, and others such as a boost controller or waste gate controller, etc. These actuator controllers then command (e.g., send outputs to) actuators controlling the throttle, spark, valves, etc., causing the engine to produce a torque 450. Based on the produced torque 450, an idle speed controller 460 generates a new idle torque request 410, whereupon the logic 360 can begin a new cycle or iteration.

The logic 360 shown in FIG. 4 may respond to A/F switching by the A/F controller after the fact, in a reactive way, by sensing changes in engine speed via feedback from the idle speed controller 460, and increasing or decreasing the engine load request 440 to compensate. Such reactive compensation can result in "dips" or "flares" of engine speed lasting several seconds.

It is noted that flow diagrams and block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Similarly, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to respond to A/F switching requests in real time, the A/F switching torque compensation system may need to operate on a frequency at least as fast as the A/F controller (e.g., 10 Hz, 50 Hz, 100 Hz, etc.).

Figure 5:
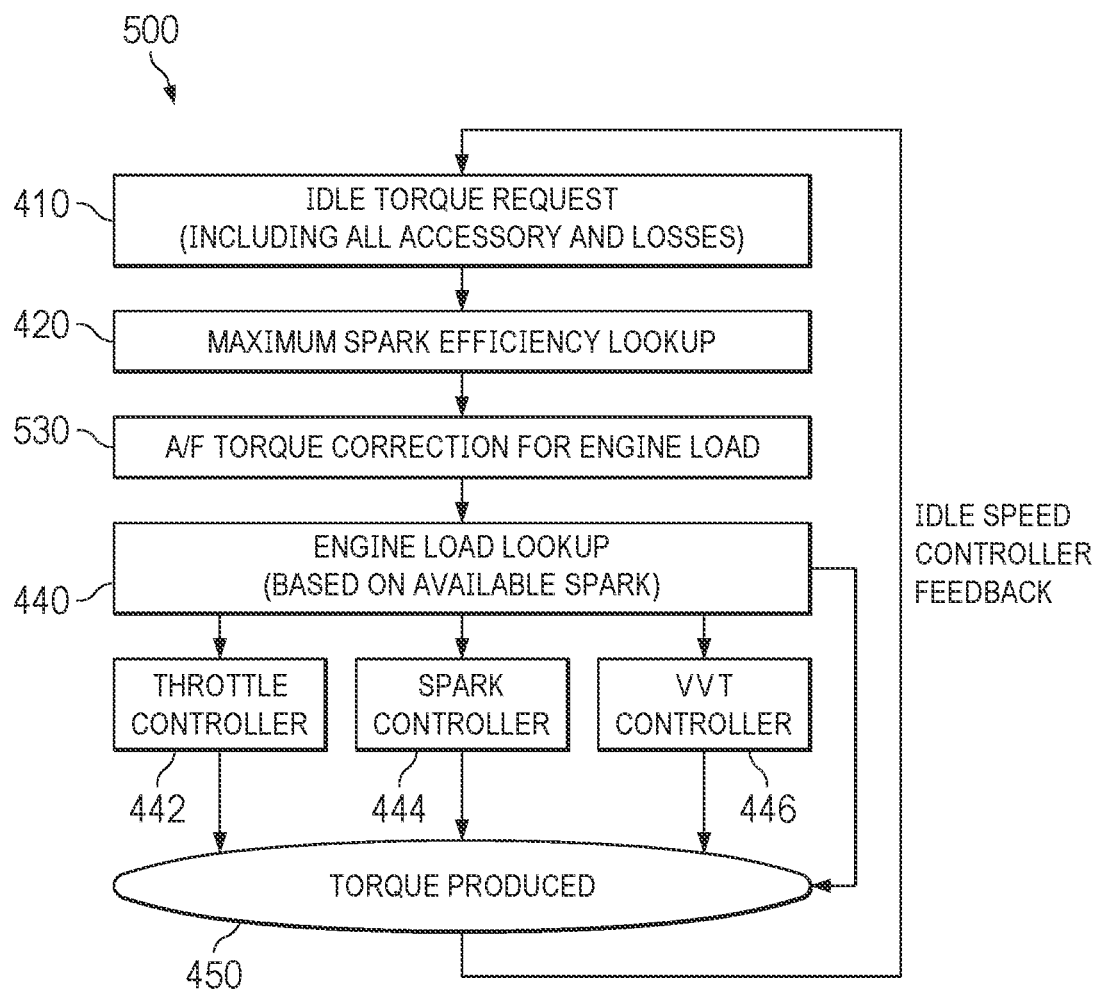
FIG. 5 is a simplified illustration of at least a portion of exemplary logic of an A/F compensated torque scheduler of the A/F switching torque compensation system, in accordance with at least one embodiment of the present disclosure.

FIG. 5 is a simplified illustration of at least a portion of exemplary logic 500 of an A/F compensated torque scheduler 210 of the A/F switching torque compensation system 100, in accordance with at least one embodiment of the present disclosure. The exemplary logic 500 is shown in a hybrid flow diagram/block diagram form. In some embodiments, the exemplary logic 360 is the A/F torque compensation engine 142.

The logic 500 receives a torque request 410 that includes sufficient torque to overcome friction losses, inertial losses, and accessory loads while maintaining the vehicle at the desired speed. Based on the torque request, the logic 500 performs a lookup or calculation of the maximum spark efficiency 420. Next, the logic 500 performs a lookup or calculation of the desired engine load request 440. However, in this case, the inputs to this calculation include the currently requested A/F ratio 530 from the A/F controller, rather than the stoichiometric A/F target.

The engine load request 440 is then sent to the actuator controllers 442, 444, 446, etc., which command actuators controlling the throttle, spark, valves, etc., causing the engine to produce a torque 450. Based on the produced torque 450, an idle speed controller 460 generates a new idle torque request 410, whereupon the logic 500 can begin a new cycle or iteration.

Unlike the logic 360 shown in FIG. 4, the logic 500 of FIG. 5 may respond proactively to A/F switching by the A/F controller, by sensing changes in the requested A/F, and increasing or decreasing the engine load request 440 to compensate. Such proactive compensation can limit or prevent "dips" or "flares" in the engine speed, by requesting engine load compensations at the same time as the A/F switching is requested.

Thus, the A/F switching torque compensation system can be seen as a system for maintaining a catalytic converter at stoichiometric emissions. Broadly, the system includes an engine with an air intake system and an exhaust system that includes the catalytic converter and an air/fuel sensor positioned downstream of the catalytic converter to measure the air/hydrocarbon ration in the exhaust. A processor in communication with the air/fuel sensor, the engine, and the air intake is configured to determine an engine speed and engine torque request, and to determine the exhaust air/fuel ratio. In some embodiments, when the exhaust air/fuel ratio is becoming rich, the system not only increases the A/F ratio of the engine's combustion mixture, but also reduces engine airflow by reducing the throttle setting. Similarly, when the exhaust air/fuel ratio is becoming lean, the system can not only decrease the A/F ratio of the combustion mixture sent to the engine, but can also increase engine airflow by increasing the throttle setting. This proactive changing of the throttle setting (and thus the engine's air intake), in response to changes in the A/F ratio of the exhaust, maintains the engine speed at a relatively constant value by smoothing the engine speed over a predetermined period of time.

Figure 6:
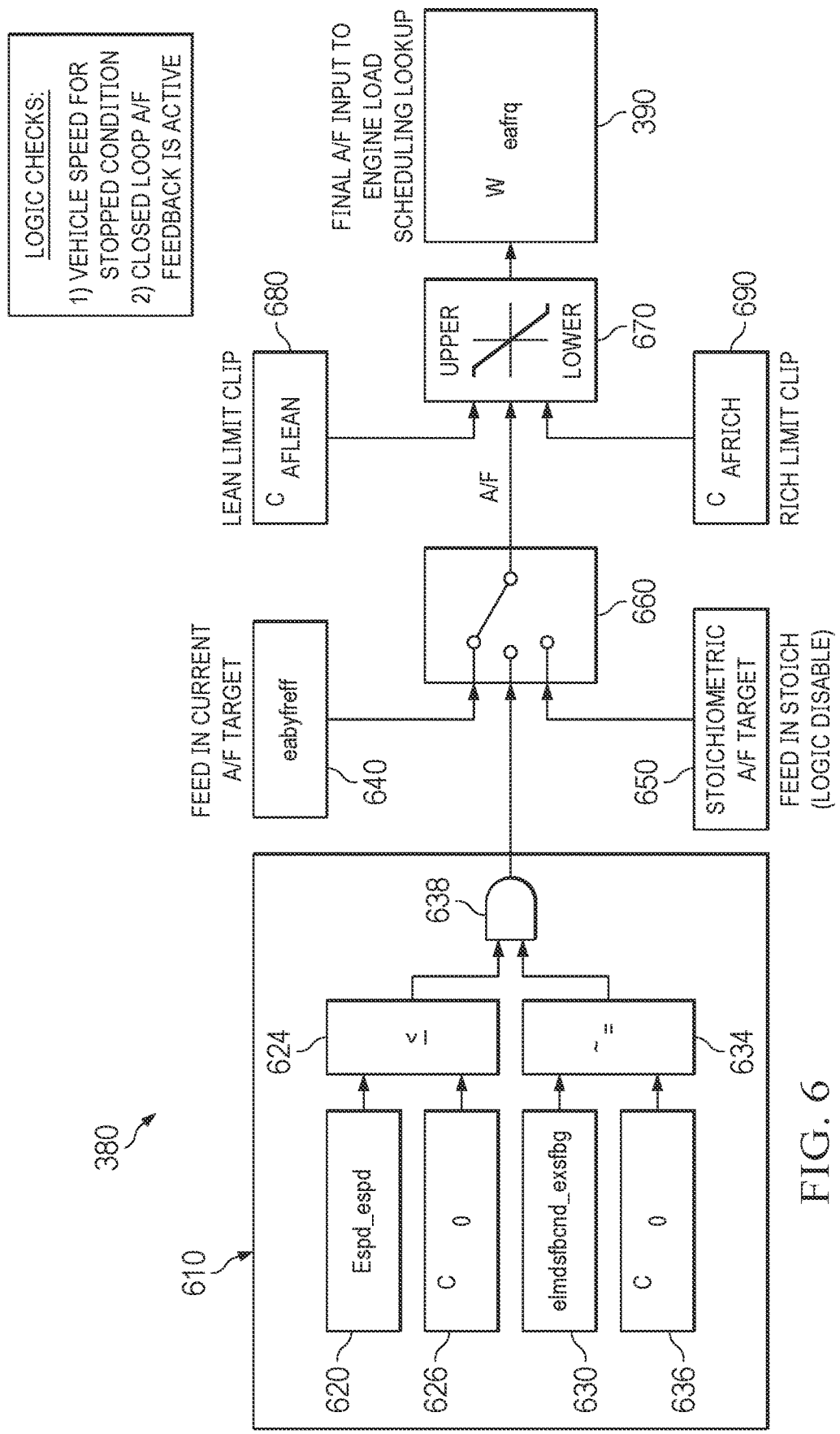
FIG. 6 is an illustration, in hybrid block diagram/flow diagram form, of an example A/F correction calculation, in accordance with at least one embodiment of the present disclosure.

FIG. 6 is an illustration, in hybrid block diagram/flow diagram form, of an example A/F correction calculation 380, in accordance with at least one embodiment of the present disclosure. The A/F correction calculation receives, as inputs, the vehicle speed 520 (e.g., from speedometer 270 of FIG. 2) and a flag 530 indicating whether A/F switching logic is active (e.g., 1=active, 0=not active). In an example, the A/F switching logic occurs in the VCU 110, A/F controller 205, Power Train ECU 113, or other controller or processor, and is a closed control loop that adjusts the air-fuel ratio in real time based on readings from the A/F sensor 285 located within the exhaust system 215 downstream of the catalytic converter 217, in order to maintain the reactions within the catalytic converter 217 at near-stoichiometric levels.

In the example shown in FIG. 6, a comparator 524 checks to see whether the vehicle speed 520 is less than or equal to a threshold value 526. The threshold value may for example be zero, or may be a representative "parking lot" speed such as 5 miles per hour (8 kilometers per hour). This check ensures the vehicle engine is at or near idle conditions. Other checks may be used instead or in addition, such as checking whether engine speed is below a threshold number of revolutions per minute, whether the accelerator pedal is at zero deflection, etc. Similarly, a comparator 534 checks whether the A/F switching flag 530 is equal to a test value (e.g., 1 or "True"). In some cases, this flag may be set to true if an A/F switching algorithm is operating. In other cases, this flag may be set to true if the currently selected value for A/F is different than the most recent previous value (e.g., if an A/F switch has just occurred).

If both of these blocking conditions are true, an AND gate 638 activates a switch 660 to select, as an input, the current A/F target 640 from the A/F switching loop or control loop. If both conditions are not true (e.g., if one or both conditions are false), the switch instead selects the stoichiometric A/F target 650 (e.g., the dimensionless value 14.6).

Next, a limiter 670 takes the selected A/F target (either current A/F target 640 or stoichiometric A/F target 650) and compares it against an upper limit 680 (also known as a lean limit clip) and a lower limit or threshold 690 (also known as a rich limit clip). If the selected A/F target is higher than the upper limit or threshold 680, then the upper limit 680 is used instead of the selected A/F target. If the selected A/F target is smaller than the lower limit 690, then the lower limit 690 is used instead of the selected A/F target. If the selected A/F target is in between the upper limit and lower limit, then the selected A/F target is used.

The result of these conditional tests is the final A/F output or A/F engine load correction term 390, which is used by the torque scheduler to generate an engine load request. Thus, the A/F correction calculation 380 configures the torque scheduler to compensate for idle-mode A/F switching when it occurs, and to use the stoichiometric A/F target in other cases (e.g., when the vehicle is driving at speed and/or when A/F switching is not occurring). This arrangement advantageously avoids unnecessary changes to the engine load request (e.g., changes that would not be noticed by the consumer or that might negatively impact the running of the engine).

Figure 7:
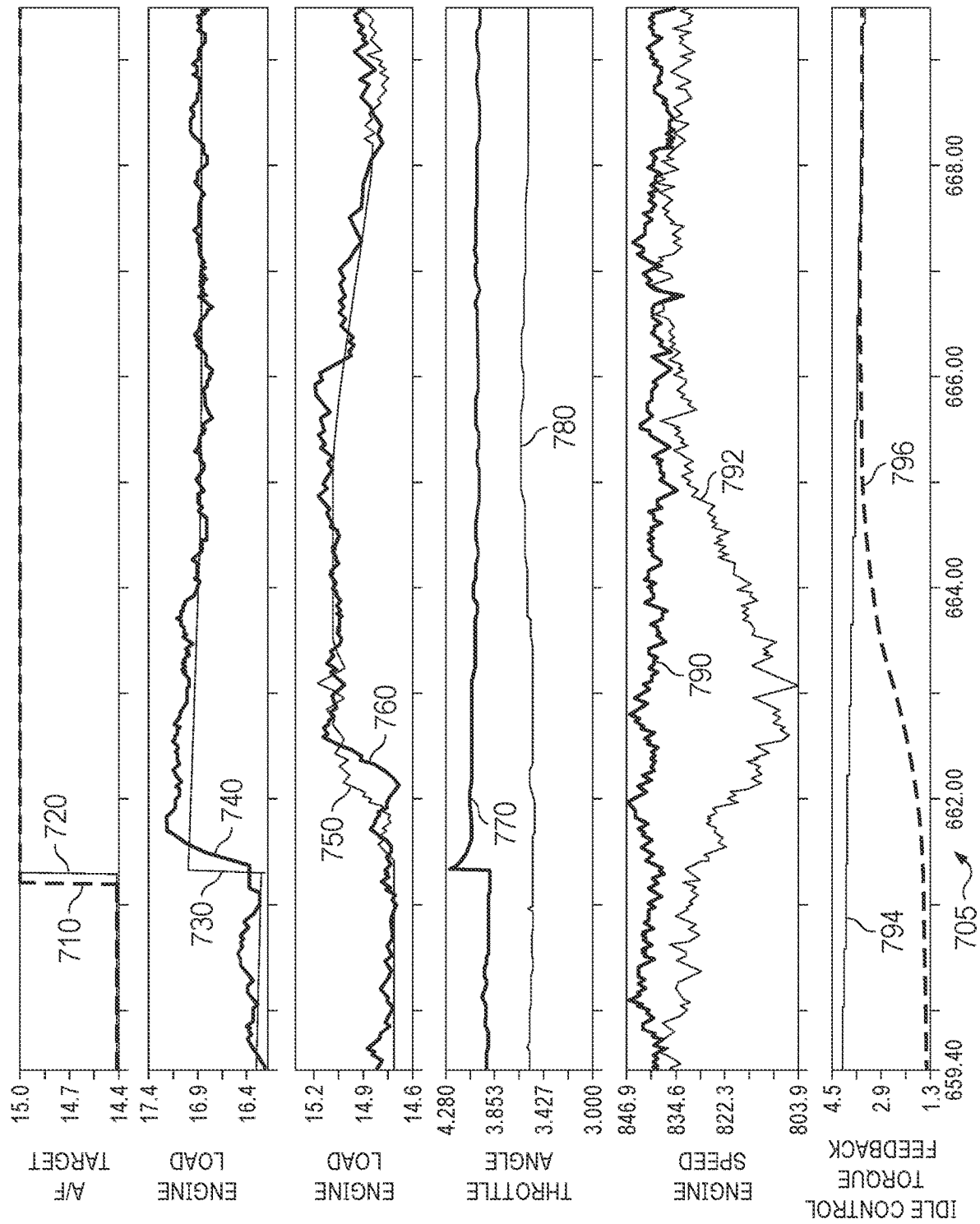
FIG. 7 is a multi-variable graph showing the performance of an example A/F switching torque compensation system with and without torque compensation, in accordance with at least one embodiment of the present disclosure.

FIG. 7 is a multi-variable graph 700 showing the performance of an example A/F switching torque compensation system 100 with and without torque compensation, in accordance with at least one embodiment of the present disclosure. In the example of FIG. 7, the X-axis 705 represents time in seconds. Curves 710 and 720 each represent a requested increase in A/F target, from a dimensionless ratio of 14.4 (e.g., a fuel-rich mixture) to a dimensionless ratio of 15.0 (e.g., a fuel-lean mixture).

Curves 730 and 740 represent, respectively, the requested engine load and actual engine load (as a percentage of maximum) following the A/F target switching event of curve 710, using the A/F switching torque compensation logic of FIGS. 5 and 6. As can be seen, the requested engine load 730 increases as a step function as the A/F switching event occurs, and the actual engine load 740 increases over a period of approximately one second, such that it is at a desired level (e.g., a level that compensates for the A/F switch) such that as the A/F switching takes effect, the resulting changes in combustion and torque production are compensated for with a change in load request.

Curves 750 and 760 represent, respectively, the requested engine load and actual engine load (as a percentage of maximum) following the A/F target switching event of curve 720, using the uncompensated torque scheduling logic of FIG. 4 (e.g., using the stoichiometric A/F target rather than the current A/F target). As can be seen, the requested engine load 750 increases gradually, over a period of approximately 1.5 seconds, following the A/F switching event, with the actual engine load 760 lagging slightly behind. This slower response occurs because the uncompensated torque scheduling logic can only respond reactively to detected changes in torque after they occur.

Curve 770 represents the throttle angle of the engine following the A/F target switching event of curve 710, using the A/F switching torque compensation logic of FIGS. 5 and 6. As can be seen, the compensation logic opens the throttle in conjunction with the step-function increase in requested engine load in curve 730.

Curve 780 represents the throttle angle of the engine following the A/F target switching event of curve 720, using the uncompensated torque scheduling logic of FIG. 4 (e.g., using the stoichiometric A/F target rather than the current A/F target). As can be seen, the throttle angle increases only very gradually, starting approximately 0.5 seconds after the A/F target switch and continuing for approximately 4 seconds thereafter. This much slower and more gradual response occurs because the uncompensated torque scheduling logic can only respond reactively to detected changes in torque after they occur.

Curve 790 represents the engine speed in revolutions per minute (RPM), following the A/F target switching event of curve 710, using the A/F switching torque compensation logic of FIGS. 5 and 6. As can be seen, the compensation logic holds the engine speed relatively constant (e.g., within ±5 RPM or 0.6%), despite the 0.4 ratio increase in A/F shown in curve 710. This occurs because the compensation logic increases the engine load request along with the requested increase in A/F, to compensate for the leaner mixture.

Curve 792 represents the engine speed in RPM, following the A/F target switching event of curve 720, using the uncompensated torque scheduling logic of FIG. 4 (e.g., using the stoichiometric A/F target rather than the current A/F target). As can be seen, the engine speed dips significantly in response to the leaner air-fuel mixture—a 3.6% total drop over a period of about two seconds, slowly recovering over a period of 2-3 seconds. This dip occurs because the uncompensated torque scheduling logic can only respond reactively to detected changes in torque after they have already occurred.

Curve 794 represents the idle control torque feedback in Newton-meters (Nm), following the A/F target switching event of curve 710, using the A/F switching torque compensation logic of FIGS. 5 and 6. As can be seen, the idle control torque feedback remains relatively constant, with a change of about 35% over a period of approximately 6 seconds. This occurs because there is no significant dip in engine power, and thus no significant torque reduction to compensate for.

Curve 796 represents the idle control torque feedback in Nm, following the A/F target switching event of curve 720. using the uncompensated torque scheduling logic of FIG. 4 (e.g., using the stoichiometric A/F target rather than the current A/F target). As can be seen, the idle control torque feedback increases by about 170% over a period of 4 seconds, to compensate for the dip in engine power caused by the leaner air-fuel mixture following the A/F switching event of curve 720.

Thus, it can be seen that the A/F switching torque compensation logic of FIGS. 5 and 6 results in much less variability in engine speed and torque output when an A/F increase is requested.

Figure 8:
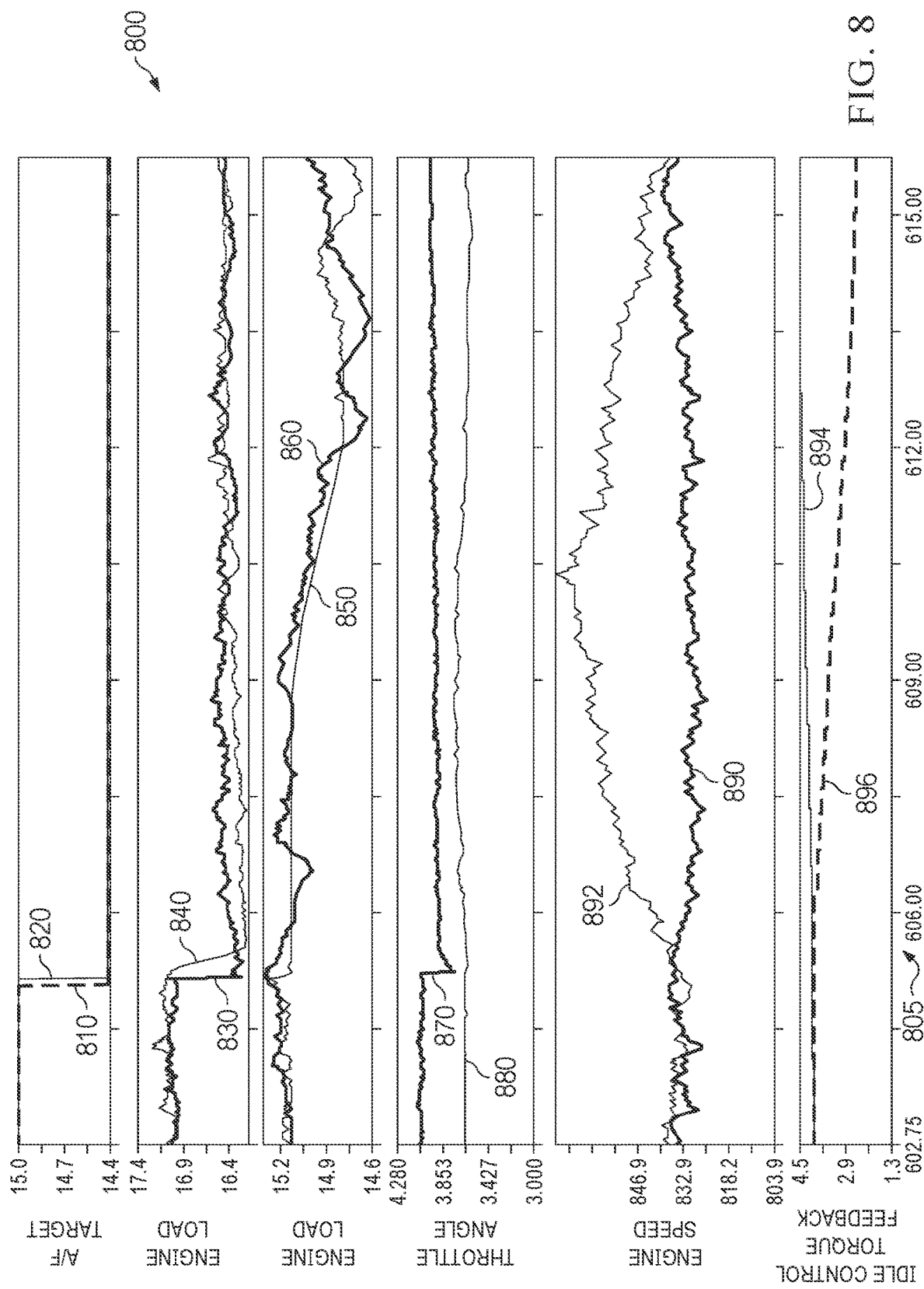
FIG. 8 is a multi-variable graph showing the performance of an example A/F switching torque compensation system with and without torque compensation, in accordance with at least one embodiment of the present disclosure.

FIG. 8 is a multi-variable graph 800 showing the performance of an example A/F switching torque compensation system 100 with and without torque compensation, in accordance with at least one embodiment of the present disclosure. In the example of FIG. 8, the X-axis 805 represents time in seconds. Curves 810 and 820 each represent a requested decrease in A/F target, from a dimensionless ratio of 15.0 (e.g., a fuel-lean mixture) to a dimensionless ratio of 14.4 (e.g., a fuel-rich mixture).

Curves 830 and 840 represent, respectively, the requested engine load and actual engine load (as a percentage of maximum) following the A/F target switching event of curve 810, using the A/F switching torque compensation logic of FIGS. 5 and 6. As can be seen, the requested engine load 730 decreases as a step function as the A/F switching event occurs, with the actual engine load 740 following roughly 0.25 seconds later, such that it is at a desired level (e.g., a level that compensates for the A/F switch) by the time the combustion and torque production are affected by the A/F target switch.

Curves 850 and 860 represent, respectively, the requested engine load and actual engine load (as a percentage of maximum) following the A/F target switching event of curve 820, using the uncompensated torque scheduling logic of FIG. 4 (e.g., using the stoichiometric A/F target rather than the current A/F target). As can be seen, the requested engine load 850 decreases gradually, over a period of approximately 4 seconds, following the A/F switching event, with the actual engine load 860 lagging slightly behind. This slower response occurs because the uncompensated torque scheduling logic can only respond reactively to detected changes in torque after they occur.

Curve 870 represents the throttle angle of the engine following the A/F target switching event of curve 810, using the A/F switching torque compensation logic of FIGS. 5 and 6. As can be seen, the compensation logic closes the throttle slightly in conjunction with the step-function decrease in requested engine load in curve 830.

Curve 880 represents the throttle angle of the engine following the A/F target switching event of curve 820, using the uncompensated torque scheduling logic of FIG. 4 (e.g., using the stoichiometric A/F target rather than the current A/F target). As can be seen, the throttle angle does not change significantly in response to the A/F switching event.

Curve 890 represents the engine speed in revolutions per minute (RPM), following the A/F target switching event of curve 810, using the A/F switching torque compensation logic of FIGS. 5 and 6. As can be seen, the compensation logic holds the engine speed relatively constant (e.g., within ±5 RPM or 0.6%), despite the 4.2% decrease in A/F shown in curve 810. This occurs because the compensation logic decreases the engine load request along with the requested decrease in A/F, to compensate for the richer mixture.

Curve 892 represents the engine speed in RPM, following the A/F target switching event of curve 820, using the uncompensated torque scheduling logic of FIG. 4 (e.g., using the stoichiometric A/F target rather than the current A/F target). As can be seen, the engine speed flares significantly in response to the leaner air-fuel mixture—a 0.36 ratio increase over a period of about 4 seconds, slowly recovering over a period of 4 seconds. This flare occurs because the uncompensated torque scheduling logic can only respond reactively to detected changes in torque after they have already occurred.

Curve 894 represents the idle control torque feedback in Newton-meters (Nm), following the A/F target switching event of curve 810, using the A/F switching torque compensation logic of FIGS. 5 and 6. As can be seen, the idle control torque feedback remains relatively constant, with a change of 14% over a period of approximately 6 seconds. This occurs because there is no significant flare in engine power, and thus no significant torque increase to compensate for.

Curve 896 represents the idle control torque feedback in Nm, following the A/F target switching event of curve 820. using the uncompensated torque scheduling logic of FIG. 4 (e.g., using the stoichiometric A/F target rather than the current A/F target). As can be seen, the idle control torque feedback decreases by about 30% over a period of 6 seconds, to compensate for the flare in engine power caused by the richer air-fuel mixture following the A/F switching event of curve 820.

Thus, it can be seen that the A/F switching torque compensation logic of FIGS. 5 and 6 results in much less variability in engine speed and torque output when an A/F decrease is requested.

Figure 9:
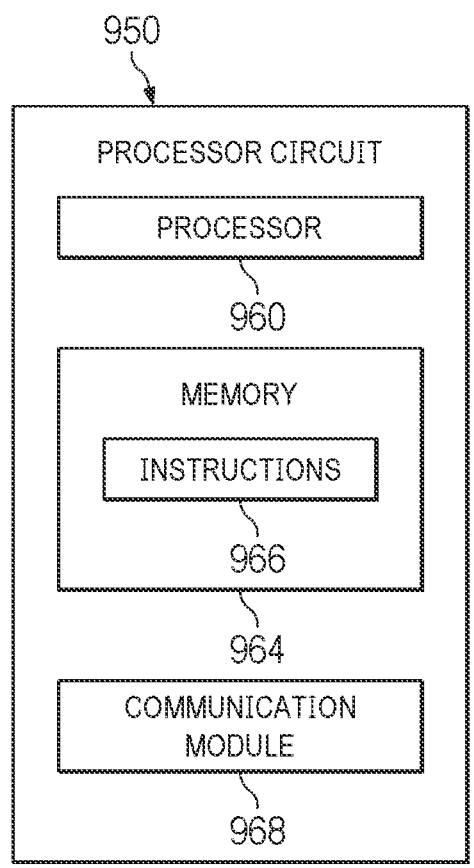
FIG. 9 is an illustration, in a block-diagram form, of a processor circuit, according to embodiments of the present disclosure.

FIG. 9 is a schematic diagram of a processor circuit 950, according to embodiments of the present disclosure. The processor circuit 950 may for example be implemented in the A/F torque compensation engine 142, VCU 110, or power train ECU 113 of FIGS. 1-2, or other devices or workstations (e.g., third-party workstations, network routers, etc.), or on a cloud processor or other remote processing unit, as necessary to implement the method. As shown, the processor circuit 950 may include a processor 960, a memory 964, and a communication module 968. These elements may be in direct or indirect communication with each other, for example via one or more buses.

The processor 960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 960 may also comprise another hardware device, a firmware device, or any combination thereof configured to perform the operations described herein. The processor 960 may also be implemented as a combination of computing devices, e.g., a combination of a DSP and a microprocessor, a plurality of microprocessors, one or more microprocessors in conjunction with a DSP core, or any other such configuration. In some instances, the processor 960 may comprise multiple processors or sub-processors in different locations, as when calculations are performed across a network.

The memory 964 may include a cache memory (e.g., a cache memory of the processor 960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 964 includes a non-transitory computer-readable medium. The memory 964 may store instructions 966. The instructions 966 may include instructions that, when executed by the processor 960, cause the processor 960 to perform the operations described herein. Instructions 966 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 968 can include any electronic circuitry and/or logic circuitry to facilitate direct or indirect communication of data between the processor circuit 950, and other processors or devices. In that regard, the communication module 968 can be an input/output (I/O) device. In some instances, the communication module 968 facilitates direct or indirect communication between various elements of the processor circuit 950 and/or the A/F switching torque compensation system 100. The communication module 968 may communicate within the processor circuit 950 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, data transmission between the processor and central server, or readings from the driving profile adaptation system) may be accomplished using any suitable wireless or wired communication technology, e.g., a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the A/F switching torque compensation system advantageously provides a capability for real-time or near-real-time compensation in engine load requests based on emissions-related changes in A/F ratio. Depending on the implementation, a number of variations are possible on the examples and embodiments described above. For example, the technology may be applied to different vehicle types, including on-road and off-road vehicles, two-wheeled, three-wheeled, four-wheeled, and multi-wheeled vehicles, gasoline vehicles, diesel vehicles, hybrid vehicles, manually operated vehicles, partially autonomous vehicles, and fully autonomous vehicles. Other variables and other logical or arithmetic operations may be employed than those described above, in order to quantify the changes in engine load necessary to compensate for changes in A/F ratio. Although the logic herein is described in relation to engines operating at idle, the same principles may be applied to engines operating at speed.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the A/F switching torque compensation system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the A/F switching torque compensation system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising:
one or more processors disposed within the vehicle and configured to:
select an air/fuel ratio for an engine of the vehicle, wherein the selected air/fuel ratio is different from a stoichiometric air/fuel ratio;
select a torque request for the engine;
determine a load request for the engine based on at least the torque request and the selected air/fuel ratio; and
determine a first output to a throttle actuator based on the load request for the engine,
wherein the one or more processors are further configured to:
if the selected air/fuel ratio exceeds a threshold maximum, determine the load request for the engine based on at least the torque request and the threshold maximum; and
if the selected air/fuel ratio is less than a threshold minimum, determine the load request for the engine based on at least the torque request and the threshold minimum.

2. The vehicle of claim 1, wherein the one or more processors are further configured to determine a second output to a spark actuator based on the load request for the engine.

3. The vehicle of claim 1, wherein the one or more processors are further configured to determine a third output to a variable valve timing (VVT) actuator based on the load request for the engine.

4. The vehicle of claim 1, wherein selecting the air/fuel ratio is based at least in part on a sensor reading from an air/fuel sensor located downstream of a catalytic converter in an exhaust system of the vehicle.

5. The vehicle of claim 4, wherein the air/fuel ratio is selected to improve performance of the catalytic converter by affecting a ratio of oxygen and hydrocarbons stored within a catalyst of the catalytic converter.

6. The vehicle of claim 5, wherein affecting the ratio of oxygen and hydrocarbons stored within the catalyst includes driving the ratio closer to a stoichiometric ratio.

7. The vehicle of claim 1, wherein the engine is at idle.

8. The vehicle of claim 1, wherein the one or more processors are configured to, if blocking criteria are not met, determine the load request for the engine based on at least the torque request and a stoichiometric air/fuel ratio.

9. The vehicle of claim 8, wherein the blocking criteria include whether a speed of the vehicle is below a threshold value.

10. The vehicle of claim 8, wherein the blocking criteria include whether the selected air/fuel ratio is different from a previously selected air/fuel ratio.

11. The vehicle of claim 1, wherein determining the load request for the engine based on at least the torque request and the selected air/fuel ratio prevents a dip or surge in engine speed when the selected air/fuel ratio is different from a previously selected air/fuel ratio.

12. A method comprising:
with one or more processors disposed within a vehicle:
selecting an air/fuel ratio for an engine of the vehicle, wherein the selected air/fuel ratio is different from a stoichiometric air/fuel ratio;
selecting a torque request for the engine;
determining a load request for the engine based on at least the torque request and the selected air/fuel ratio; and
determining, based on the load request for the engine, at least one of a first output to a throttle actuator, a second output to a spark actuator, or a third output to a variable valve timing (VVT) actuator;
if the selected air/fuel ratio exceeds a threshold maximum, determining the load request for the engine based on at least the torque request and the threshold maximum; and
if the selected air/fuel ratio is less than a threshold minimum, determining the load request for the engine based on at least the torque request and the threshold minimum.

13. The method of claim 12, wherein selecting the air/fuel ratio is based at least in part on a sensor reading from an air/fuel sensor located downstream of a catalytic converter in an exhaust system of the vehicle, and
wherein the air/fuel ratio is selected to improve performance of the catalytic converter by affecting a ratio of oxygen and hydrocarbons stored within a catalyst of the catalytic converter by driving the ratio closer to a stoichiometric ratio.

14. The method of claim 13, further comprising: if blocking criteria are not met, determining the load request for the engine based on at least the torque request and a stoichiometric air/fuel ratio.

15. The method of claim 14, wherein the blocking criteria include whether a speed of vehicle is below a threshold value.

16. The method of claim 14, wherein the blocking criteria include whether the selected air/fuel ratio is different from a previously selected air/fuel ratio.

17. A system comprising:
a vehicle;
one or more processors disposed within the vehicle and configured to, if an engine of the vehicle is at idle:
select an air/fuel ratio for the engine of based at least in part on a sensor reading from an air/fuel sensor located downstream of a catalytic converter in an exhaust system of the vehicle, wherein the selected air/fuel ratio is different from a stoichiometric air/fuel ratio;
select a torque request for the engine;
if the selected air/fuel ratio exceeds a threshold maximum, determine a load request for the engine based on at least the torque request and the threshold maximum;
if the selected air/fuel ratio is less than a threshold minimum, determine the load request for the engine based on at least the torque request and the threshold minimum;
if the selected air/fuel ratio is between the threshold minimum and the threshold maximum, determine the load request for the engine based on at least the torque request and the selected air/fuel ratio; and
determine, based on the load request for the engine, at least one of a first output to a throttle actuator, a second output to a spark actuator, or a third output to a variable valve timing (VVT) actuator.

18. The system of claim 17, wherein the one or more processors are further configured to:
- if the selected air/fuel ratio exceeds a threshold maximum, determine the load request for the engine based on at least the torque request and the threshold maximum; and
- if the selected air/fuel ratio is less than a threshold minimum, determine the load request for the engine based on at least the torque request and the threshold minimum.

* * * * *